Patented July 25, 1944

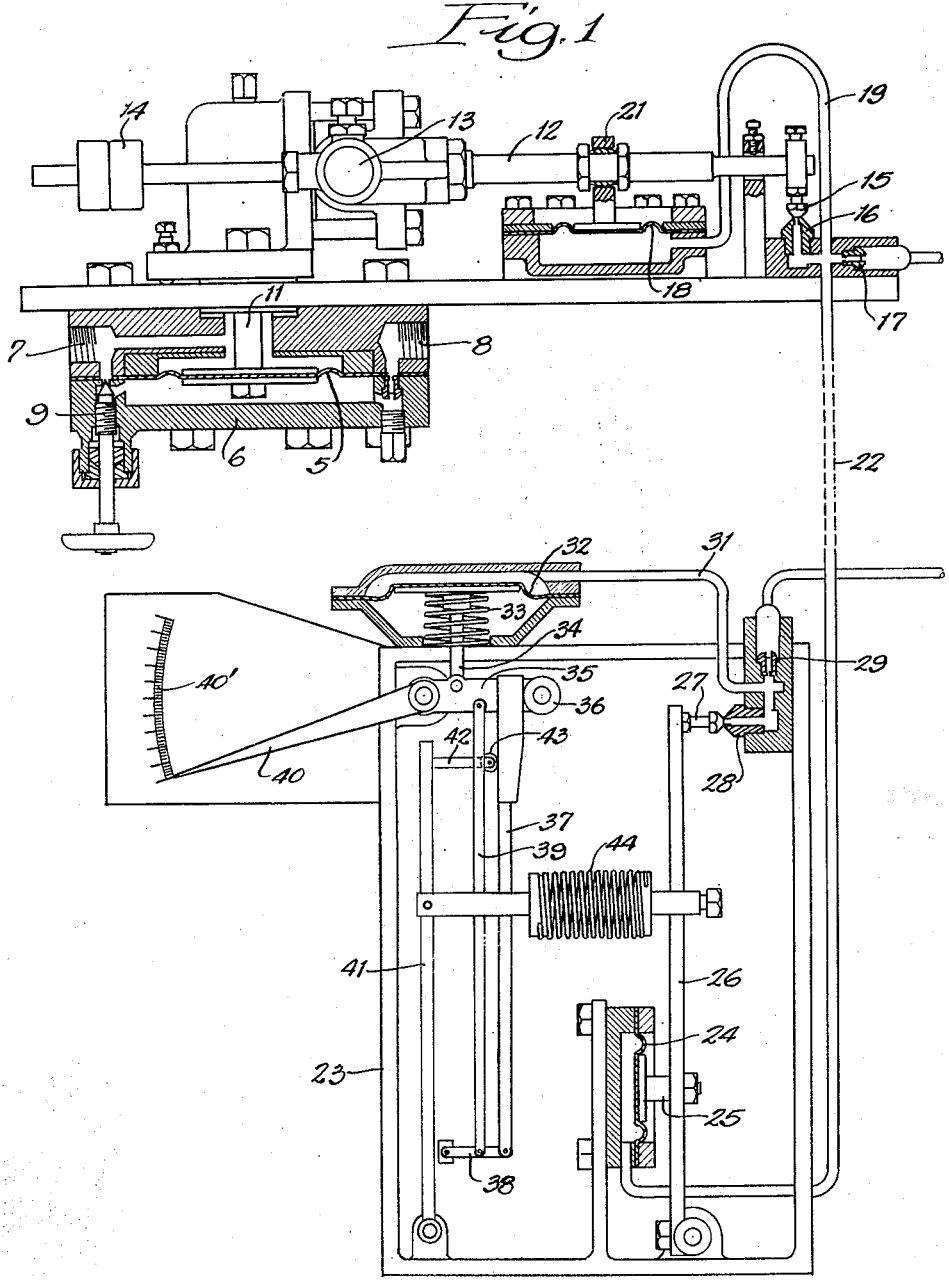

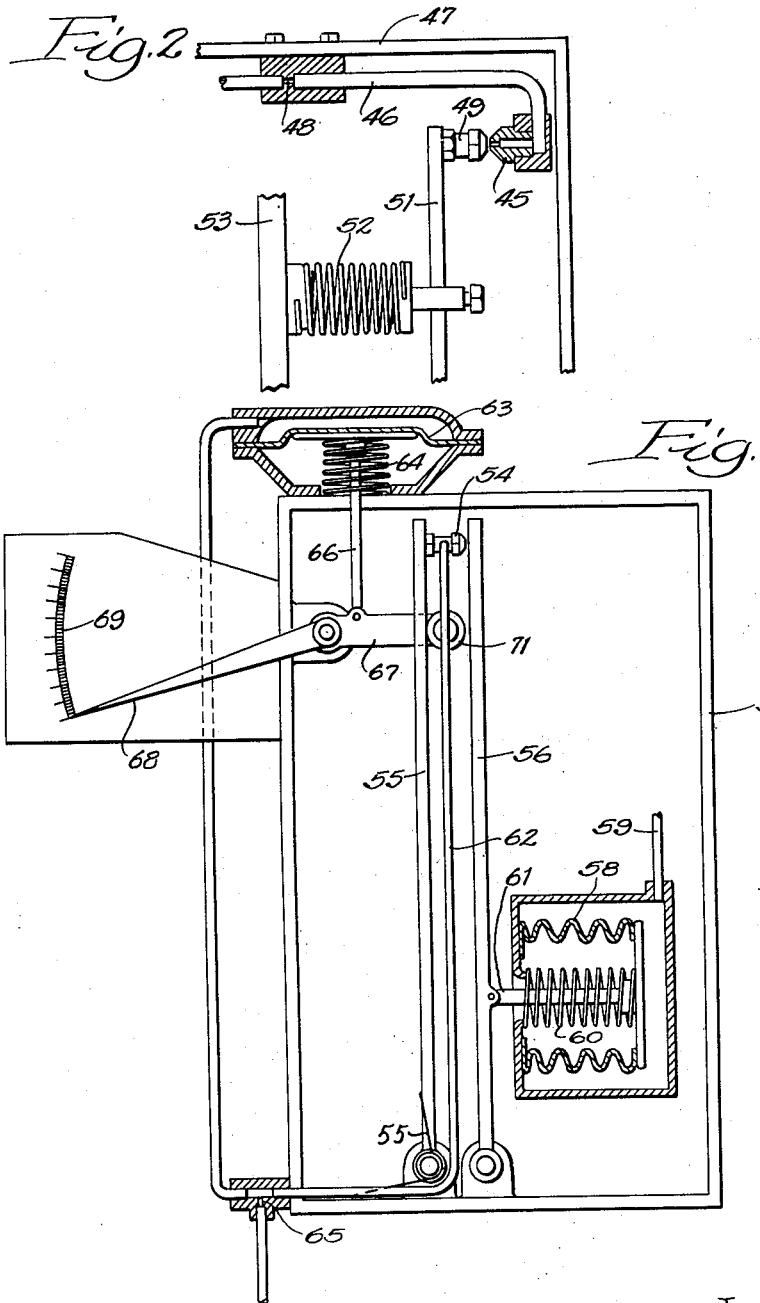

2,354,423

UNITED STATES PATENT OFFICE 2,354,423

PRESSURE RESPONSIVE MEASURING INSTRUMENT

Albert J. Rosenberger, Wilmette, Ill., assignor to Republic Flow Meters Company, Chicago, Ill., a corporation of Illinois Application September 8, 1941, Serial No. 409,995

9 Claims. (Cl. 73—110)

This invention relates to measuring instruments and more particularly to an instrument for producing a movement proportional to variations in a physical condition.

One of the objects of the invention is to provide a measuring instrument in which a condition may be measured at one point and a movement responsive to the condition for indicating or the like is produced at another point.

Another object of the invention is to produce a measuring instrument in which compensation is provided for variations in temperature.

Still another object of the invention is to provide a measuring instrument which is simple and compact in construction and at the same time is highly efficient and capable of extreme accuracy.

The above and other objects and advantages of the invention will be apparent from the following description when read in connection with the accompanying drawings, in which:

Figure 1 is a diagrammatic view with parts in section and parts in elevation of an instrument embodying the invention;

Figure 2 is a partial view similar to Figure 1, illustrating the construction to compensate for temperature variations; and Figure 3 is a partial view similar to Figure 1, showing an alternative construction.

The instrument of Figure 1 is particularly designed to measure fluid flow, and includes a flexible diaphragm 5 supported in and dividing a casing 6, which communicates through passages 7 and 8 with the opposite sides of an orifice in a flow conduit. The opposite sides of the diaphragm may be connected for calibration or the like through a passage controlled by a valve 9.

The diaphragm actuates a rod 11, which exerts a force on one end of a balance member or weigh beam 12, which is pivoted at 13. The weigh beam 12 is preferably counter-balanced by weights 14, so that in its static condition, it is balanced about the pivoted point 13. The push rod 11 may be connected to the weigh beam and sealed against leakage of fluid therepast by means of a diaphragm seal of the type more particularly disclosed and claimed in my co-pending application, Serial No. 409,996, filed September 8, 1941.

The free end of the weigh beam carries a bleed valve member 15, cooperating with an orifice 16, receiving fluid such as air under pressure through a restriction 17. As the valve member 15 moves toward and away from the orifice 16, pressure between the orifice and the restriction will be increased or decreased as will be understood.

The weigh beam is rebalanced against changes in the force exerted by the diaphragm 5 by means of a second diaphragm 18, communicating on its lower side with the nozzle 16 through a pipe 19. The diaphragm 18 is connected to the weigh beam 12 by a collar 21, to exert a force on the weigh beam balancing the force exerted by diaphragm 5.

Pressure from the orifice 16 as controlled by the valve member 15 is conducted through a pipe 22 to a receiving instrument enclosed in a casing 23, which may be mounted either closely adjacent to or remote from the sending instrument, as desired. The pipe 22 communicates with one side of a flexible diaphragm 24, which is connected through a rod 25 to a pivoted lever 26. The other end of the lever 26 carries a valve member 27, cooperating with an orifice 28, receiving air under pressure through a restriction 29. The orifice 28 communicates through a pipe 31 with a diaphragm 32, urged in one direction by a spring 33 so as to move the diaphragm in accordance with variations in the orifice pressure.

The diaphragm 32 is connected through a rod 34 with a lever 35, pivoted in the casing 23 and carrying at one end a roller 36. If desired, the lever 35 may carry a pointer 40, cooperating with a scale 40', calibrated in terms of the flow to be measured.

The roller 36 engages one surface of a floating lever 37, pivoted at one end on a link 38, which is connected to the lever 35 to move therewith by a link 39. The lever 37 is held against the roller by means of a lever 41 pivoted in the casing and having a projecting arm 42 carrying a roller 43, which bears against one side of the lever 37. A tension spring 44 connects the lever 41 to the lever 26.

In operation, the differential pressure across the diaphragm 5 creates a force tending to rock the weigh beam 12 in one direction or the other. For example, an upward force on the diaphragm tends to move the valve member 15 downwardly against the orifice 16, whereby increasing the pressure back of the orifice. This increased pressure is conducted to the diaphragm 18 through the conduit 19 and creates an upward force on the weigh beam on the side of the pivot opposite to the push rod 11, so as to rebalance the weigh beam. The increased pressure is also conducted through the pipe 22 to the diaphragm 24, urging the lever 26 to the right to restrict the orifice 28. This causes an increase in the pressure behind the orifice 28, which is conducted to the diaphragm 32, moving it downwardly against the spring 33. Movement of diaphragm 32 rocks pointer 40 across the scale 40', which may be calibrated to indicate the flow creating the force on the diaphragm 5. At the same time, clockwise movement of the lever 35 moves the roller 36 over the lever 37 and tends to rock the lever 37 to the left. This presses the roller 43 to the left, increasing the tension on the spring 44, which is transmitted to the lever 26 to balance the increased pressure exerted thereon by the diaphragm 24. Thus, the parts will take up a new balanced position in response to each change in the differential pressure on the diaphragm 5.

The cooperation of the levers 35 and 37 causes the lever 37 to move an amount approximately equal to the versed sine of the angle through which lever 35 is moved, as modified by the ratio of the lengths between levers 35 and 37. By properly proportioning the lengths of these levers, the movement of lever 37, and consequently of the spring 44, may be made to approximate very closely the square root of the movement of the lever 35. Due to this construction, tensioning of the spring 44 follows the square root function, and movement of the lever 35 will be directly proportional to variations in the flow creating the differential on diaphragm 5. Thus, the movement of the pointer 40 is directly proportional to flow variations and the scale 41' may be uniformly calibrated. This is highly advantageous, both for indicating and for control functions, which may be regulated in accordance with movement of the pointer.

I have found that the ratio between the lengths of lever 35 and lever 37 should be approximately 15 to 1 for accurate operation. Since it would be impractical to make the lever 37 of the necessary length to provide this ratio, the linkage mechanism 38—39—41 has been provided. The lever 35 and link 38 are made of different lengths so proportioned as to give the lever 37 an angular movement corresponding to the angular movement of a longer lever mounted on a fixed pivot. By properly proportioning this link and lever and by connecting them with the link 39 so that their angular movement is properly related, the lever 37 may be made relatively short, but may have an effective movement corresponding to that of a much longer lever. Thus, I am able to use a relatively long lever at 35 to obtain a relatively large movement of the spring 44 without increasing the length of the lever 37 unduly.

Figure 2 illustrates a construction similar to that of Figure 1, in which provision is made for temperature compensation. In this construction, an orifice 45 is supported on an elongated tube 46, secured to the housing 47. Fluid is admitted to the orifice through a restriction 48 and through a tube 46, the orifice being controlled by a valve member 49 carried by a lever 51. The lever is connected to a spring 52 which is secured at its opposite end to a lever 53, these parts not being shown in detail, since they may be generally similar to the corresponding parts in Figure 1.

The spring 52 is preferably made of a material which has a constant modulus of elasticity, but whose initial tension may be affected by changes in temperature. One such material, which I have found to be satisfactory, is sold under the trade name "Elinvar." The pipe 46 on which the orifice 45 is supported is made of a material having a different coefficient of expansion than the material of the casing 47, so that upon changes in temperature, the orifice 45 will be moved slightly due to variations in length of the pipe 46. By properly selecting the material of the pipe 46 and correlating its coefficient of expansion with that of the spring 52, the orifice 45 may be made to move an amount sufficient to compensate for changes in initial tension of the spring due to variations in temperature. Since the modulus of elasticity of the spring does not change, the characteristics of the instrument will remain constant and the movement of the orifice 45 will compensate for changes in initial tension so as to maintain constant the zero setting of the instrument.

In the construction of Figures 1 and 2, the control valve 27—28 is controlled by a balance of forces between the diaphragm 24 and the spring 44. Figure 3 illustrates an alternative construction in which the valve is controlled by a position follow-up system, in which the orifice 54 is supported on a lever 55, and is controlled by a second lever 56, both levers being fixedly pivoted in the casing 57. The lever 56 is controlled by a bellows 58, exposed on its outer surface to regulated pressure from the sending device conducted thereto through a pipe 59, and is expanded by a spring 60. The end of the bellows is connected through a rod 61 to the lever 56.

The orifice 54 is connected through a pipe 62 with the upper surface of a diaphragm 63, which is urged upwardly by a spring 64. Fluid under pressure is supplied to the orifice and to the diaphragm through a restriction 65, the pressure exerted on the diaphragm being controlled by the valve couple. The diaphragm 63 is connected through a rod 66 to a lever 67, carrying a pointer 68, movable over a scale 69. The lever 67 also carries a roller 71, engaging one surface of the lever 55, the lever 55 being held in contact with the roller by a spring 55'.

In operation, an increase in pressure on the bellows 58 will urge the lever 56 toward the orifice 54, increasing the pressure acting on the diaphragm 63. This will move the diaphragm downwardly, rocking the lever 67 clockwise and through the roller 71, moving the orifice 54 away from the lever 56 until a balance is reached. In this construction, the lever 55 will be caused to follow movements of the lever 56 in either direction and because of the cooperation between levers 55 and 67, the pressure acting on diaphragm 63 will approximate the square root of the pressure on the bellows 58.

To compensate for variations in temperature, the spring 60 may be made of the same material as spring 52 of Figure 2, and the connecting rod 61 may be made of a similar material, having a similar coefficient of expansion. Thus, variations in temperature will affect spring 60 and rod 61 in the same way, so that the lever 56 will be maintained in the same position regardless of temperature changes.

While several embodiments of the invention have been shown and described in detail, it will be understood that these are illustrative only and are not intended to be taken as a definition of the scope of the invention, reference being had for this purpose to the appended claims.

What is claimed is:

1. A measuring instrument comprising balance means, means responsive to a differential pressure across a restriction in a conduit containing flowing fluid to urge the balance means in one direction, a fluid pressure control device controlled by said balance means to produce a regulated fluid pressure, means responsive to said regulated pressure to urge the balance means in the opposite direction, a receiving device including a pressure responsive element connected to said control device to be responsive to said regulated fluid pressure, a control device controlled by said element to produce a second regulated fluid pressure, a device movable in response to said second fluid pressure, a movable member cooperating with the last named control device to control said second fluid pressure, and square root mechanism connecting said member to said device movable in response to said second fluid pressure.

2. A measuring instrument comprising balance means, means responsive to a differential pressure across a restriction in a conduit containing flowing fluid to urge the balance means in one direction, a fluid pressure control device controlled by said balance means to produce a regulated fluid pressure, means responsive to said regulated pressure to urge the balance means in the opposite direction, a receiving device including a pressure responsive element connected to said control device to be responsive to said regulated fluid pressure, a control device controlled by said element to produce a second regulated fluid pressure, a device movable in response to said second fluid pressure, a movable member cooperating with the last named control device to control said second fluid pressure square root mechanism moved by said last named device, and a spring connecting said square root mechanism to said movable member.

3. In a measuring instrument the combination of a sensitive element responsive to a regulated pressure for producing a force, a spring balancing said force, a control device having two relatively movable parts, a housing, a connection between one of said parts and the housing and a connection between the other of said parts and said sensitive element, one of said connections being formed of a material whose temperature coefficient of expansion is such as to compensate for variations in the initial tension of said spring upon changes in temperature.

4. In a measuring instrument the combination of a sensitive element responsive to a regulated pressure for producing a force, a spring balancing said force, a control device having two relatively movable parts, a housing, a connection between one of said parts and the housing and a connection between the other of said parts and said sensitive element, said first named connection having a different coefficient of expansion than the housing to cause a movement of said one of the parts upon a change in temperature to compensate for changes in the initial tension of the spring due to such change in temperature.

5. In a measuring instrument including a part movable in proportion to a regulated pressure, a square root mechanism comprising a pivoted lever connected to said part to be moved thereby, a floating lever engaging the free end of said pivoted lever means yieldingly holding the floating lever in engagement with the pivoted lever, a pivoted link pivotally supporting said floating lever and of a different length than said first named lever, and a connection between the link and first named lever to move the link as the lever moves.

6. In a measuring instrument including a part movable in proportion to a regulated pressure, a square root mechanism comprising a pivoted lever connected to said part to be moved thereby, a roller adjacent the free end of said lever, a floating lever engaging said roller, a pivoted link substantially parallel to the first lever and pivotally supporting the floating lever, a connection between the first lever and the link to cause them to move together, a lever lying beside and engaging the floating lever, and resilient means urging the last named lever into engagement with the floating lever and the floating lever into engagement with the roller.

7. In a measuring instrument, a pressure responsive element movable in response to a controlling pressure, a control valve connected to the responsive element to produce a regulated pressure, a pressure responsive device connected to the control valve and movable in response to the regulated pressure, a pivoted lever connected to the device to be moved thereby, a floating lever engaging the free end of the pivoted lever, a pivoted link pivotally connected to the floating lever to support it, means connecting the link to the pivoted lever to move the link as the lever moves, and means connecting the floating lever to the control valve.

8. In a measuring instrument, a pressure responsive element movable in response to a controlling pressure, a control valve connected to the responsive element to produce a regulated pressure, a pressure responsive device connected to the control valve and movable in response to the regulated pressure, a pivoted lever connected to the device to be moved thereby, a floating lever engaging the free end of the pivoted lever, a pivoted link pivotally connected to the floating lever to support it, means connecting the link to the pivoted lever to move the link as the lever moves, and means including a spring connecting the floating lever to the control valve.

9. In a measuring instrument, a pressure responsive element movable in response to a controlling pressure, a control valve connected to the responsive element to produce a regulated pressure, a pressure responsive device connected to the control valve and movable in response to the regulated pressure, a pivoted lever connected to the device to be moved thereby, a floating lever engaging the free end of the pivoted lever, a pivoted link pivotally connected to the floating lever to support it, means connecting the link to the pivoted lever to move the link as the lever moves, a third lever pivoted at one end and engaging the floating lever adjacent its opposite end, and means including a spring connecting the third lever to the control valve.

ALBERT J. ROSENBERGER.